United States Patent [19]

Gould

[11] 3,919,397
[45] Nov. 11, 1975

[54] CATALYTIC PREPARATION OF NO

[75] Inventor: Robert Kindade Gould, East Windsor, N.J.

[73] Assignee: Aerochem Research Labs., Inc., Princeton, N.J.

[22] Filed: Nov. 30, 1973

[21] Appl. No.: 420,379

[52] U.S. Cl. ............... 423/405; 23/232; 252/477 R
[51] Int. Cl.² ........................................ C01B 21/24
[58] Field of Search .............. 423/403, 405; 23/232; 252/477 R

[56] References Cited
UNITED STATES PATENTS

| | | | |
|---|---|---|---|
| 2,850,366 | 9/1958 | Houdry | 423/213.2 X |
| 3,507,627 | 4/1970 | Frant et al. | 252/477 |
| 3,647,387 | 5/1972 | Benson et al. | 23/232 |
| 3,730,686 | 5/1973 | Breitenbach et al. | 423/405 X |

OTHER PUBLICATIONS

Redmond; "Journal of Physical Chemistry"; Vol. 67, pp. 788–793 (1963).
"Chemical Abstracts"; Vol. 28; 1934; 2255.
"Chemical Abstracts"; Vol. 34, 1940; p. 7711.

*Primary Examiner*—G. O. Peters
*Attorney, Agent, or Firm*—Theodore B. Roessel; Roger Aceto

[57] ABSTRACT

A method and apparatus for converting oxides of nitrogen to nitric oxide is disclosed wherein the gas to be treated is passed through a plurality of alumina tubes each containing a wire of catalytic material which is wound into and through the tubes. The wire, preferably platinum, is connected to a source of electrical energy for resistively heating the wire. In its fashion, the gas to be treated flowing through the tubes is forced into intimate contact with the heated wire of catalyst material to speed the reaction and conversion of the gas to nitric oxide.

1 Claim, 2 Drawing Figures

CATALYTIC PREPARATION OF NO

BACKGROUND OF THE INVENTION

The present invention relates to catalytic converters and more specifically to a method and apparatus for converting the oxides of nitrogen, such a nitrogen dioxide to nitric oxide.

A well known technique employing the chemiluminescent reaction between nitric oxide and ozone is used for measuring the concentration of atmospheric nitric oxide. In the chemiluminescent reaction, ozone combines with nitric oxide to produce nitrogen dioxide, oxygen and light. The quantity of light which it produced is a measurement of the concentration or amount of nitrogen oxide present in the sample gas.

The chemiluminescent technique has been extended to the measurement of nitrogen dioxide or mixtures of nitric oxide and nitrogen dioxide in air, stack gas, automobile exhaust, etc. In order to accurately measure the amount of nitric oxide or nitrogen dioxide by the chemiluminescent technique, it is necessary to convert the nitrogen dioxide concentration in the gas being tested to nitric oxide. The device performing this condition is called an $NO_x$ converter wherein the symbol $NO_x$ means mixtures of nitric oxide and nitrogen dioxide.

$NO_x$ converters are well known in the art and are generally of two types. In one type, as examplified by U.S. Pat. No. 3,730,686, the catalyst material is packed in tubes and heated by a resistance coil on the outside of the tube. In another type of converter, as shown for example in A.P.C. Ser. No. 365,412, the gas to be treated is heated to the reaction temperature prior to contacting the catalyst material. Thus typical catalyst converters of the prior art are constructed so that the catalytic material is indirectly heated.

For purposes of $NO_x$ converters various metals have been used as for example molybdenum, manganese, silver, vanadium, or tungsten as well as gold, stainless steel of various types and carbon/metal mixtures. However, these materials are consumed in the reaction with $NO_2$ to produce NO and are therefore, not properly catalysts. U.S. Pat. No. 3,328,115, indicates that metals from the platinum group in the form of crystalites have been found useful in the catalytic purification of gases containing oxides of nitrogen.

SUMMARY OF THE INVENTION

In the method and apparatus of the present invention, the catalyst is in the form of a resistively heated platinum wire which is wound through a number of parallel flow tubes. The gaseous reactant is passed through these tubes to place the gaseous reactant in intimate contact with the hot surface of the platinum wire catalyst.

OBJECTS OF THE INVENTION

One object of the present invention is to provide an improved method and apparatus for the catalytic conversion of $NO_x$ to nitrogen oxide.

Another object of the present invention is to provide a method and apparatus for the catalytic conversion of $NO_x$ to nitric oxide wherein the catalyst is in the form of a heated platinum wire.

A further object of the present invention, is to provide a method and apparatus for the catalytic conversion for $NO_x$ to nitric oxide wherein the gas is passed through an arrangement of parallel tubes and an intimate contact with a resistively heated catalyst wire within the tubes.

These and other objects advantages and characterizing features of the present invention will become more apparent upon consideration of the following detailed description thereof when taken in connection with the accompanying drawing depicting the same.

DESCRIPTION OF PREFERRED EMBODIMENTS

Figure 1:
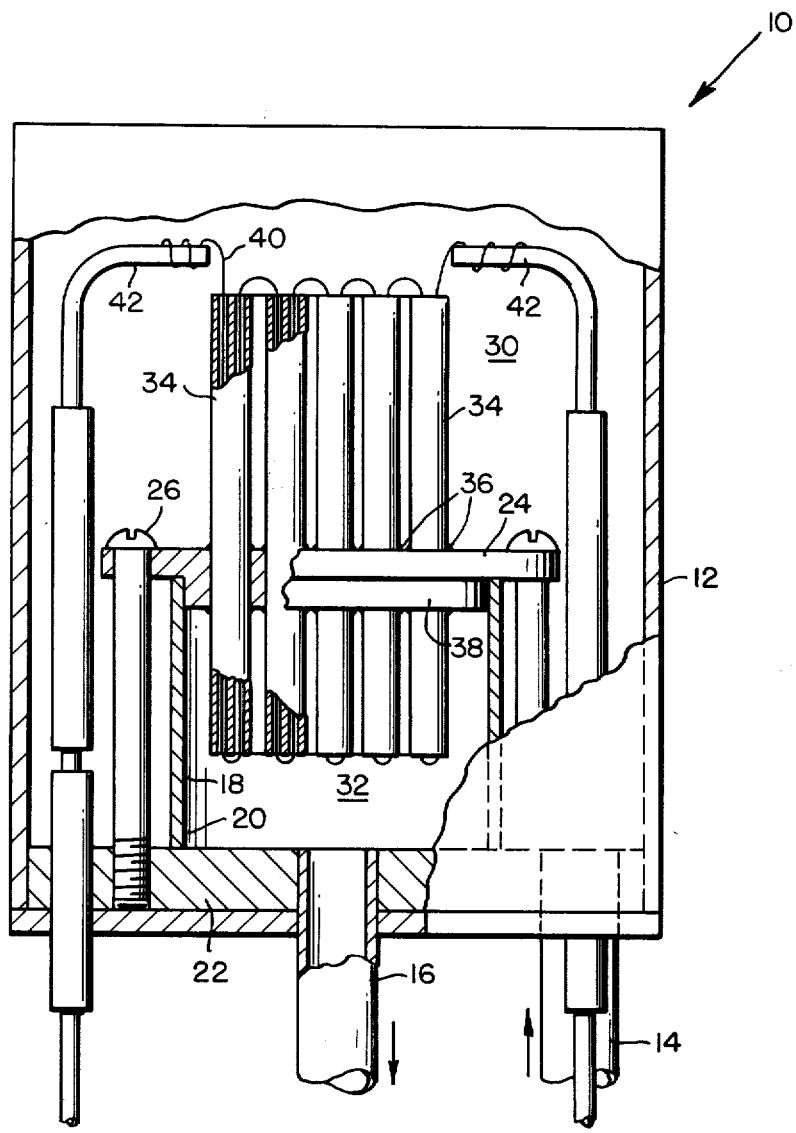
FIG. 1 is a view, partly broken away and in section, of the catalytic converter of the present invention.

Referring to the drawing, the figure shows the converter of the present invention generally indicated a 10 to include a housing 12 having a gas inlet 14 and gas outlet 16. Preferably, the housing is cylindrical and made of a corrosion resistant material such as stainless steel. It should be understood that all components within the housing, unless otherwise specified are made from a corrosion resistant material such as stainless steel.

Disposed within housing and about outlet 16, is a portion formed by an upstanding cylindrical member 18. Cylinder 18 has its lower end 20 fixed in a gas tight sealing relationship with the bottom 22 of the housing. The top of cylindrical member 18 carries a plate 24. The plate is urged against the top of the cylinder by screws 26 which are threaded into base 22 of the housing. With such an arrangement, the interior of the housing is effectively divided into two chambers. One chamber 30 being the volume disposed outside of cylinder 18 and the second chamber 32 being the volume within cylinder 18.

Figure 2:
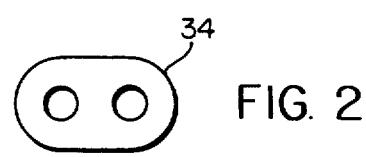
FIG. 2 is a plan view of one tubular member 34 on an enlarged scale.

Mounted to and extending through plate 24 are a plurality of tubes 34 which comprise the sole communication between the chambers. These tubes communicate between chambers 30 and 32 so that the gas flowing through inlet 14 into the chamber 30 reverses direction and flows through tubes 34 into chamber 32 and out of the housing via outlet 16. Preferably, tubes 34 are double hole as shown in FIG. 2 and are made of alumina which is inert and resists corrosive attack by the gasses being introduced into the housing.

In order to insure the separation of the incoming gas, in chamber 30, from the treated gas in chamber 32, tubes 34 are preferably mounted to plate 34 by a suitable ceramic cement as indicated at 36. In addition, another member 38 may be located adjacent the underside of plate 24 to seal around tubes 34 and between cylinder 18 and plate 24.

The structure of converter 10 is completed by a resistively heated wire catalyst 40, which is wound through the alumina tubes. The ends of the wire catalyst are attached to terminals 42, which in turn pass out of housing 12 for connection to a source of electrical energy (not shown). Preferably wire catalyst 40 is a platinum wire.

A converter was actually constructed using 19 double-hole aluminum tubes 34 so that there were a total of 38 individual passages between chambers 30 and 32. Each tube had an outside diameter of 1/8 in., an inside diameter of 1/32 in. and a length of 1 1/2 in. The platinum wire, used as a catalyst was .008 in. in diameter and 62 in. long. The converter, which required a power of approximately 150 watts operated for 4 months at a nitrogen dioxide to nitric oxide conversion efficiency of approximately 95%. During the 4 month period, the concentration of nitrogen dioxide was greater than 10 ppm for several weeks of that time. Tests have also shown that the converter of the present invention is able to convert nitrogen dioxide to nitric oxide at concentrations of up to 1,000 ppm (by volume) nitrogen dioxide, at flow rates of at least 40 ml/sec of sample gas (STP).

In operation, then, the gas to be treated is introduced into chamber 30 through inlet 14. The gas reverses flow and passes through tubes 34. In flowing through these tubes the gas is forced into intimate contact with the platinum wire, which has been resistively heated to approximately 900°C. In this manner, the nitrogen dioxide is converted within the tubes to nitric oxide. The gas then flows from the tubes into chamber 32 and then out of the housing through outlet 16 to a chemiluminescent monitor (not shown) where the nitric oxide concentration is reacted with ozone.

In one series of tests on air sample containing 148 ppm $NO_x$ was introduced into the converter at a rate of 35 ml/sec. The sample was prepared by allowing $O_3$ containing air to react with NO to produce $NO_2$ and $O_2$. This reaction was allowed to proceed to completion before introducing the sample air into the converter. By turning the ozone producer on and off, the $NO_x$ sample fed to the converter contained either 115 ppm $NO_2$ or no $NO_2$. The platinum wires in the converter were then slowly heated until the $NO_x$ readings with the ozone producer on or off were within 1% of one another NO was monitored by an $NO/O_3$ chemiluminescent monitor placed downstream of the converter. This series of tests showed that when the platinum wire was at a temperature of 950°C, 97% of the $NO_x$ was converted while substantially 100% was converted at a temperature of 1010°C. This series of tests also showed that the efficiency of the converter is a function of the temperature of the platinum wire.

Having thus described the invention in detail, it should be appreciated that various modifications may be made without changing the scope of the invention as claimed. For example, the length of inner diameter of the alumina tubes which function to bring about close contact between the sample gas and hot platinum surface is not critical. Departures in the length of diameter may result in lessened contact between the sample and the platinum if the inner diameter of the alumina tube is greatly increased or the length greatly decreased. Conversely, a large undesirable pressure drop across the converter would occur if the inner diameter of the tubes is greatly decreased or the length of the tubes greatly increased. Of course, the number of tubes can be varied and in doing so, the length and diameter of the tubes also varied as long as contact time of the sample, with the platinum is not greatly changed.

Having thus described the invention in detail, what is claimed as new is:

1. A process for preparing a chemiluminescent reaction sample by the catalytic conversion of mixtures of nitric oxide and nitrogen dioxide gas to nitric oxide without conversion of the original nitric oxide component comprising the steps of:
    a. flowing the gas mixture through a network of parallel flow tubes having a platinum wire catalyst wound through said tubes, the dimensions of said tubes and wire being such that substantially all of the gas mixture is brought into close intimate contact with said wire catalyst as the gas mixture flows through the tubes; and
    b. resistively heating said wire catalyst to approximately 950°C to 1010°C to convert the nitrogen dioxide component of said mixture to nitric oxide.

* * * * *